United States Patent
Tsirkin et al.

(10) Patent No.: US 11,301,402 B2
(45) Date of Patent: Apr. 12, 2022

(54) NON-INTERRUPTING PORTABLE PAGE REQUEST INTERFACE

(71) Applicant: Red Hat, Inc., Raleigh, NC (US)

(72) Inventors: Michael Tsirkin, Lexington, MA (US); David Gilbert, Manchester (GB)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 16/862,858

(22) Filed: Apr. 30, 2020

(65) Prior Publication Data

US 2021/0342279 A1 Nov. 4, 2021

(51) Int. Cl.
| | |
|---|---|
| G06F 13/16 | (2006.01) |
| G06F 13/42 | (2006.01) |
| G06F 12/1009 | (2016.01) |
| G06F 9/30 | (2018.01) |
| G06F 9/455 | (2018.01) |

(52) U.S. Cl.
CPC ...... *G06F 13/1673* (2013.01); *G06F 9/30029* (2013.01); *G06F 9/45558* (2013.01); *G06F 12/1009* (2013.01); *G06F 13/4221* (2013.01); *G06F 2009/45579* (2013.01); *G06F 2009/45583* (2013.01)

(58) Field of Classification Search
CPC ............. G06F 9/30029; G06F 9/45558; G06F 12/1009; G06F 13/1673; G06F 13/4221; G06F 2009/45583; G06F 2009/45579
See application file for complete search history.

(56) References Cited

U.S. PATENT DOCUMENTS

| | | | |
|---|---|---|---|
| 8,086,821 B2 | 12/2011 | Mukherjee et al. | |
| 9,317,452 B1 | 4/2016 | Forschmiedt et al. | |
| 9,720,846 B2 | 8/2017 | Tsirkin et al. | |
| 10,509,736 B2 | 12/2019 | Raval et al. | |
| 10,642,501 B1* | 5/2020 | Patel | G06F 9/4411 |

(Continued)

OTHER PUBLICATIONS

Markussen et al., "Flexible Device Compositions and Dynamic Resource Sharing in PCIE Interconnected Clusters Using Device Lending", Dolphin Interconnect Solutions, Oslo, Norway; Simula Research Laboratory, Oslo, Norway University of Oslo, Oslo, Norway 4 Simula Metropolitan Center for Digital Engineering, Oslo, Norway, 2019, 24 pages. https://link.springer.com/article/10.1007/s10586-019-02988-0.

(Continued)

*Primary Examiner* — Eric T Oberly
(74) *Attorney, Agent, or Firm* — Lowenstein Sandler LLP

(57) ABSTRACT

Systems and methods for memory management for virtual machines. An example method may include generating, by a Peripheral Component Interconnect (PCI) device comprising an input/output memory management unit (IOMMU), a first bit sequence and generating a second sequence by applying a predetermined transformation to the first bit sequence. The method may then write the second bit sequence to a memory buffer, read a first value from the memory buffer, write the first bit sequence to the memory buffer, and read a second value from the memory buffer. Responsive to determining that the second value does not match the first value, the method may associate a writable attribute with an IOMMU page table entry associated with the memory buffer.

20 Claims, 10 Drawing Sheets

(56) References Cited

U.S. PATENT DOCUMENTS

| | | | |
|---|---|---|---|
| 2008/0235757 A1* | 9/2008 | Li | G06F 9/45558 |
| | | | 726/1 |
| 2013/0145055 A1 | 6/2013 | Kegel et al. | |
| 2014/0068137 A1* | 3/2014 | Kegel | G06F 12/109 |
| | | | 711/6 |
| 2016/0077946 A1* | 3/2016 | Raikin | G06F 13/385 |
| | | | 710/14 |
| 2019/0228145 A1* | 7/2019 | Shanbhogue | G06F 21/79 |
| 2020/0133878 A1* | 4/2020 | Asaro | G06F 9/45558 |

OTHER PUBLICATIONS

Peleg et al., "Utilizing the IOMMU Scalably", Technion—Israel Institute of Technology; Google, Jul. 10, 2015, 15 pages. https://www.usenix.org/system/files/conference/atc15/atc15-paper-peleg.pdf.

* cited by examiner

NON-INTERRUPTING PORTABLE PAGE REQUEST INTERFACE

TECHNICAL FIELD

The present disclosure is generally related to virtualized computer systems, and more particularly, to an interface for a non-interrupting portable page request.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
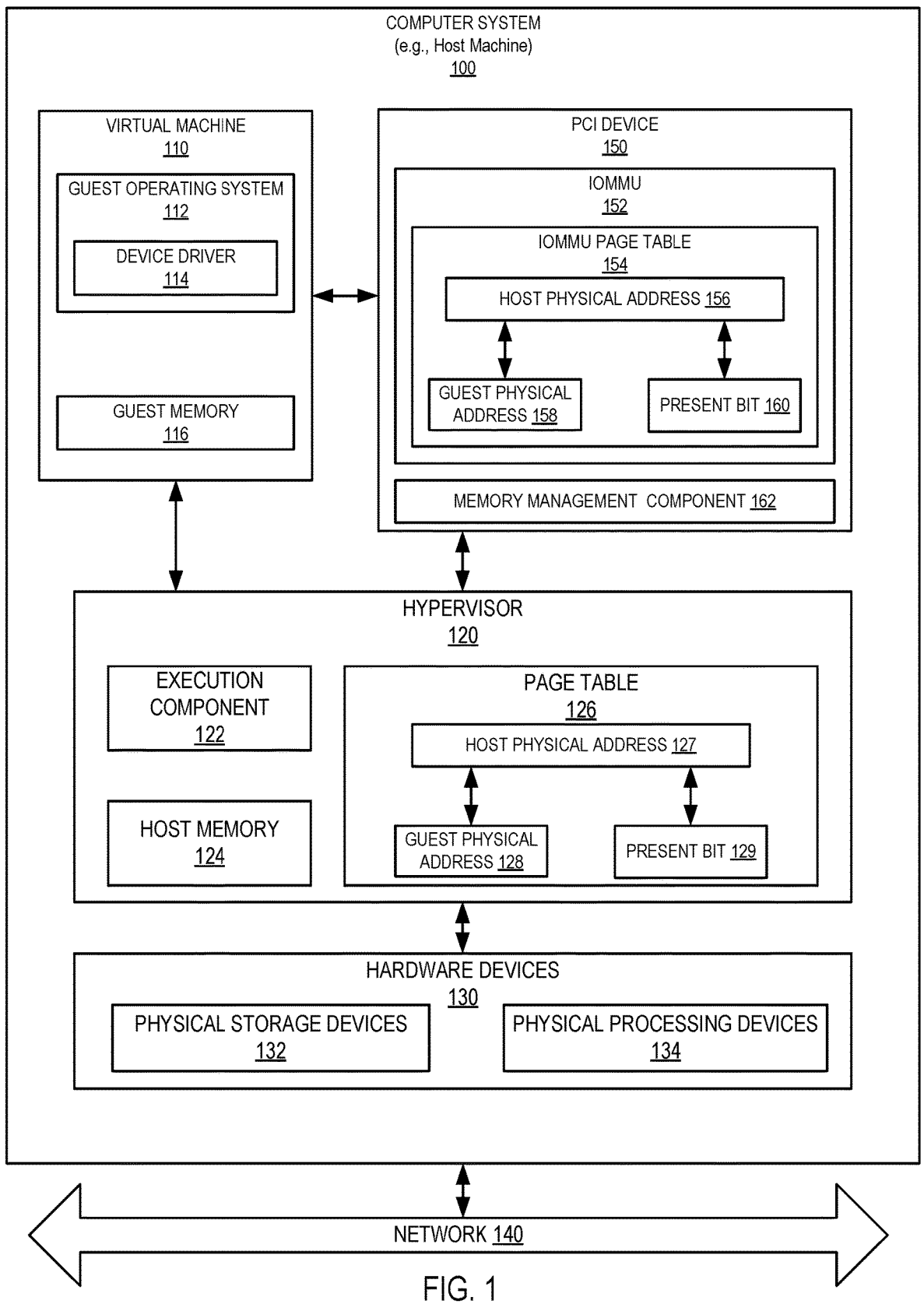
FIG. 1 depicts a high-level block diagram of an example host computer system that performs memory management for PCI devices, in accordance with one or more aspects of the present disclosure.

Described herein are systems and methods for non-interrupting portable page request interface. A page fault may occur during normal operation when a process or a virtual machine attempts to access a memory page that is not currently present in the physical memory. The page fault may include one or more signals, exceptions (e.g., hardware exception or software exception), interrupts (e.g., hardware interrupt or software interrupt), traps, messages, other signal, or a combination thereof. The page fault may be triggered by a virtual machine and handled by the hypervisor by loading the page into the physical memory from a backing store. Page faults are typically handled transparently to the virtual machine, such that the virtual machine may be unaware that the page fault occurred or was handled by the hypervisor. For example, the virtual machine may execute an instruction and it may access a memory page and appear to execute successfully, but the instruction may cause a page fault and result in the virtual machine temporarily exiting to the hypervisor (e.g., by a VMExit event) and being subsequently restarted (e.g., by a VMEnter instruction). The hypervisor may manage the loading of the data from backing store and restart the execution of the virtual machine (e.g., by VMEnter instruction). The same instruction that caused the page fault may be subsequently re-executed transparently to the virtual machine and may proceed without another page fault because the data is now present in host physical memory. Page faults are often utilized in virtualization. In an example, features such as virtual machine migration, memory overcommitment, and deduplication may use page faults to manage memory efficiently. In another example, page faults are used to service page requests from Peripheral Component Interconnect (PCI) devices.

A PCI device is an external computer hardware device that connects to a computer system and is capable of direct memory access (DMA). DMA allows a peripheral device to access the system memory for reading and/or writing independently of the central processing unit (CPU). PCI devices that are capable of performing DMA include disk drive controllers, graphics cards, network cards, sound cards, etc. While a hardware device is performing the DMA, the CPU can engage in other operations. A computer system having DMA-capable devices often uses an input/output memory management unit (IOMMU) to manage address translations. An IOMMU is a hardware memory management unit (MMU) that resides on the input/output (I/O) path connecting the device to the memory. The IOMMU may map the device address space (e.g., a bus address) that is relevant to the I/O bus into the physical address space (e.g., host physical address) that is relevant to the memory bus. The IOMMU may include an IOMMU page table, which includes a set of page table entries, such that each page table entry translates a guest physical address of a guest memory pages to a host physical address of the host memory. The IOMMU may also include extra information associated with the address space mapping such as read and write permissions.

PCI devices may use a Page Request Interface (PRI) to request memory pages from an IOMMU. In current systems, PCI devices in communication with an IOMMU over a PRI have multiple drawbacks, including quality of service and scalability issues. As a solution, some PCI devices use on-device IOMMU. To access memory pages, the PCI device sends a memory page request to a virtual machine's device driver. The driver then confirms the requested memory page is present in the host memory, upon which the PCI device then retrieves the memory page from the host memory, and stores the memory page in it the IOMMU's cache.

However, to service the page request, a page fault is required to confirm that the page is present. If system workloads do not have good locality of reference, numerous page faults would be occurring. In the case of virtual machines, this causes numerous VMExit events (virtual machine temporarily exiting) to the hypervisor to confirm to the PCI device that a specific page is mapped in the IOMMU and is safe to access, even if most memory is present and accessible.

Aspects of the present disclosure address the above-noted and other deficiencies by providing technology that enhances the memory management of virtualized computer systems. In particular, aspects of the present disclosure provide technology that allows a PCI device with an onboard IOMMU to append its own page table with page table entries referencing present memory pages that are associated with a task running on a virtual machine. This allows the PCI device to bypass the virtual machine when reading and writing data, thus preventing latency issues associated with page faults. In an example, a virtual machine may be running a task. One or more memory pages related to the task may be loaded into host memory of a hypervisor. The memory-resident pages may be indicated by a present bit at each mapping between a guest physical address and a host physical address of the memory page. The PCI device may append one or more present memory pages associated with the task to a page table of its IOMMU. When the PCI device performs DMA, the PCI device may attempt to access the requested memory page directly from the host memory by referring to the IOMMU page table. By accessing the requested memory page directly from the host memory, the PCI device does not need to go through the virtual machine, thus avoiding the virtual machine executing an instruction that causes a page fault.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machine 110, hypervisor 120, hardware devices 130, a network 140, and a Peripheral Component Interconnect (PCI) device 150.

Virtual machine 110 may execute guest executable code that uses an underlying emulation of the physical resources. The guest executable code may include a guest operating system, guest applications, guest device drivers, etc. Virtual machines 110 may support hardware emulation, full virtualization, para-virtualization, operating system-level virtualization, or a combination thereof. Virtual machine 110 may have the same or different types of guest operating systems, such as Microsoft® Windows®, Linux®, Solaris®, etc. Virtual machine 110 may execute guest operating system 112 that manages device driver 114 and guest memory 116. Device driver 114 may be any type of virtual or physical device driver, such as, for example, a vCPU driver.

In an example, the device driver 114 may be utilized for receiving memory page requests from the PCI device 150, requesting hypervisor 120 to retrieve the requested memory page, and indicating to the PCI device 150 that the requested memory page has been retrieved and is in hypervisor memory (e.g., host memory). The features provided by device driver 114 may be integrated into the operations performed by guest operating system 112. The features of device driver 114 are discussed in more detail below in regards to the computer system of FIG. 2.

Guest memory 116 may be any virtual memory, logical memory, physical memory, other portion of memory, or a combination thereof for storing, organizing, or accessing data. Guest memory 116 may represent the portion of memory that is designated by hypervisor 120 for use by virtual machine 110. Guest memory 116 may be managed by guest operating system 112 and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Host memory 124 (e.g., hypervisor memory) may be the same or similar to the guest memory but may be managed by hypervisor 120 instead of a guest operating system. Host memory 124 may include host pages, which may be in different states. The states may correspond to unallocated memory, memory allocated to guests, and memory allocated to hypervisor. The unallocated memory may be host memory pages that have not yet been allocated by host memory 124 or were previously allocated by hypervisor 120 and have since been deallocated (e.g., freed) by hypervisor 120. The memory allocated to guests may be a portion of host memory 124 that has been allocated by hypervisor 120 to virtual machine 110 and corresponds to guest memory 116.

Other portions of hypervisor memory may be allocated for use by hypervisor 120, a host operating system, hardware device, other module, or a combination thereof.

Hypervisor 120 may also be known as a virtual machine monitor (VMM) and may provide virtual machine 110 with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include an execution component 122 and a page table 126.

Page table 126 is a data structure used by hypervisor 120 to store a mapping of addresses of the guest memory 116 to addresses of the host memory 124. Accordingly, address translation is handled using the page table(s). For example, page table 126 may translate guest physical addresses 128 of guest memory 116 pages to host physical addresses 127 of host memory 124. Each mapping in page table 126 between a guest physical address 128 and a host physical address 127 may include a present bit 129 for each page to indicate whether or not the memory page that corresponds to the guest physical address is physically residing in the host physical address for a page frame in host memory 124. In an example, a present bit 129 that is enabled (e.g., set to a value of one) indicates a valid mapping where a memory page is in host memory 124. In another example, a present bit 129 that is disabled (e.g., set to a value of zero) indicates an invalid mapping where a memory page is not present in the host memory 124. Host page table 126 may include one or more page tables such as a protected host page table or an unprotected host page table. In an example, host page table 126 may be an extended page table (EPT) translating guest physical addresses to host physical addresses. In another example, the host page table may be the shadow page table translating the guest virtual addresses to host physical addresses. In another example, the host page table 126 may be the hypervisor page table, translating the guest physical addresses to hypervisor virtual addresses.

Execution component 122 may receive instructions to retrieve requested memory pages (e.g., non-present memory pages) from physical storage devices 132 and load the requested memory pages onto the host memory 124. The instructions may trigger a page fault and cause virtual machine 110 to perform a VMExit event. In an example, execution component 122 may receive the instructions from device driver 114 and retrieve one or more non-present data pages from non-volatile memory and cache the data pages into volatile memory. The execution component 122 may also map guest physical addresses and host physical addresses associated with the requested pages in host page table 126. Once the requested memory page(s) is loaded onto host physical memory 124, hypervisor 120 may restart the virtual machine (e.g., by a VMEnter instruction).

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

PCI device 150 may be a computer hardware device that plugs directly into a PCI slot of the computer system 100. PCI device 150 can be assigned to the guest operation system 112 of the virtual device 110 and can communicate with the guest operation system 112 via device driver 114. The PCI device may include DMA (direct memory access) capabilities, which allow the PCI device 150 to access system memory (e.g., physical storage devices 132) for reading and/or writing independently of a system CPU (e.g., physical processing devices 134). For example, the PCI device 150 may transfer its input/output (I/O) data directly to and from physical storage devices 132. The PCI device may perform DMA using a DMA buffer. The DMA buffer may be in the address space allocated to virtual machine 110. The DMA buffer may be used by the PCI device 150 to directly transfer input data to virtual machine 110 and/or directly transfer output data from virtual machine 110. The PCI device 150 can include an input/output memory management unit (IOMMU) 152 to manage address translations, and a memory configuration component 162.

The IOMMU 152 may map, by a page table, the device address space (e.g., a bus address) that is relevant to the I/O bus into the physical address space (e.g., host physical address) that is relevant to the memory bus. The IOMMU may include extra information associated with the address space mapping, such as read and write permissions for the memory page. The IOMMU 152 may include an IOMMU page table 154. IOMMU page table 154 may translate guest physical addresses 158 of guest memory 116 pages to host physical addresses 156 of hypervisor memory 128 (e.g., host memory). In an example where the IOMMU page table 154 format is the same a page table format used by the host system (e.g., hypervisor 120), and the memory configuration component 162 may point to the hypervisor page table 126 as a root directory. In another example where the IOMMU page table 154 format is different than the page table format used by the host system, the memory configuration component 162 may create page table entries in the IOMMU page table 154 associated with the present memory pages of a task running on virtual machine 110. Present page may include pages loaded onto host memory 124, and may be read/writeable, read-only, etc.

Each mapping in IOMMU page table 165 between a guest physical address 158 and a host physical address 156 may include a present bit 160 for each memory page to indicate whether or not the memory page that corresponds to the guest physical address is physically residing in the host physical address for a page frame in host memory 124. In an example, a present bit 160 that is enabled (e.g., set to a value of one) indicates a valid mapping where a page is in host memory 124. In another example, a present bit 160 that is disabled (e.g., set to a value of zero) indicates an invalid mapping where a page is not present in the host memory 124 and the PCI device 150 cannot access the page. The memory management component 162 may request non-present memory pages from the virtual machine 110, and may perform write functions. The features of memory configuration component 162 are discussed in more detail below in regards to FIG. 2.

Figure 2:
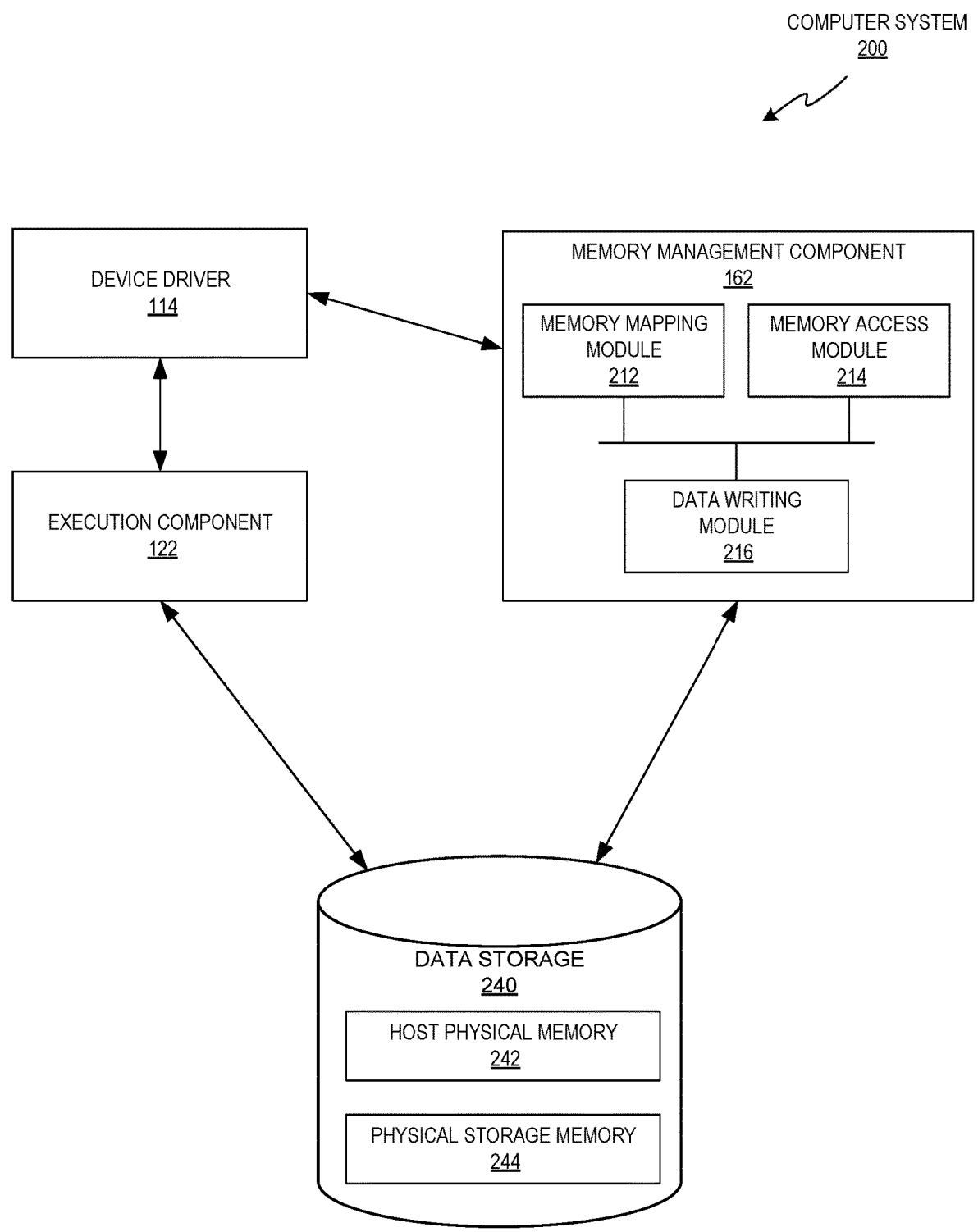
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include a memory management component 162, device driver 114, execution component 122, and data storage 240.

Memory management component 162 may enable computer system 200 to map plurality of records referencing memory pages to an IOMMU page table and perform write sequences to enhance the performance of computer system 200. As illustrated, memory management component 122 may include a memory mapping module 212, a memory access module 214, and a sequence writing module 216.

Memory mapping module 212 may determine that a virtual machine is running a task. One or more memory pages related to the task may be loaded into host memory. Loaded memory pages may be referred to as "present memory pages" and loaded memory pages that are read-only may be referred to as "read-only memory pages." Loaded pages may be indicated by a present bit at each mapping in between a guest physical address and a host physical address. Memory pages that are not loaded into host memory may reside in physical storage memory (e.g., physical storage devices 132) and may be referred to as "non-present memory pages." When the virtual machine is running the task, memory mapping module 212 may append records referencing one or more present memory pages associated with the task to a page table 154 of an IOMMU 152. Memory mapping module 212 may also append records referencing one or more read-only memory pages associated with the task to the IOMMU page table 154. For example, memory mapping module 212 may update the IOMMU page table 154 to include page table entries for present memory pages and read-only memory pages. In an example, when the IOMMU page table 154 format is the same a page table format used by the host system (e.g., hypervisor 120), the memory mapping component 212 may point to the host page table (e.g., page table 124) of the task as a root directory. In another example, when the IOMMU page table 154 format is different than the page table format used by the host system, the memory mapping module 212 may create page table entries in the IOMMU page table 154 associated with the present memory pages and the read-only memory pages.

Memory access module 214 may attempt memory accesses. In an example, when the memory management component 162 receives a memory page request to access one or more memory page(s) related to the task, the memory access module 214 may attempt to access the requested memory page directly from the host physical memory 242 by referring to the IOMMU page table 154. Host physical memory 242 may be host memory 124. By accessing the requested memory page directly from the host physical memory 242, the memory access module 214 does not need to go through the virtual machine, thus avoiding the virtual machine executing an instruction that causes a page fault.

When a requested memory page is not mapped in the IOMMU page table 154, an unsupported request error may occur in response to a memory page request by the memory access module 214. In response an unsupported request error, the memory access module 214 may request the requested memory page from the device driver 114 of virtual machine 110. The device driver 114 may then execute an instruction to the execution component 122 of hypervisor 120, which may trigger a page fault and causes the virtual machine 110 to perform a VMExit event. The instruction may request the execution component 122 to retrieve the requested memory page from physical storage memory 244 and load the requested memory page onto the host physical memory 242. In an example, execution module 122 may retrieve the requested data page from non-volatile memory and cache the requested data page into volatile memory. The execution component 122 may also map the requested page in the host page table (e.g., host page table 124). Once the requested memory page is loaded onto the host physical memory 242, the hypervisor 120 may restart the virtual machine (e.g., by a VMEnter instruction). Device driver 114 may then indicate to memory access module 214 that the requested page is loaded into the host physical memory 244. The memory access module 214 may then re-request the memory page from the host physical memory 244.

The data writing module 216 may write data to a portion of memory on the data storage 240. In an example, the data writing module 216 may not know which memory pages of the host physical memory 242 are writeable and which memory pages are read-only memory pages. As such, in conventional systems, an attempt to write data to a portion of memory that includes at least one read-only page will result in a write error. Write errors do not trigger an unsupported request error. Thus, a write error may be silently discarded. To address this scenario, the following procedure may be performed by the data writing module 216.

The data writing module 216 may generate a bit sequence relating to write data and select a portion of memory onto which to write the data sequence. The data writing module 216 may then generate a test bit sequence by applying a predetermined transformation to the first sequence. The transformation may include inverting one or more bits in each byte, incrementing a byte by one, applying a bitwise XOR to a byte (thus inverting each bit), or any other transformation that would result in the test bit sequence having at least one bit in each byte be different from the bit sequence. The data writing module 216 may then write the test bit sequence to a memory buffer. The memory buffer may be a memory page referenced by the IOMMU page table. The data writing module 216 may then read a first value from the memory buffer. The data writing module 216 may then write the bit sequence to the memory buffer and read a second value from the memory buffer. The data writing module 216 may then determine whether the second value matches the first value. When second value does not match the first value, the write module 216 may associate a writable attribute with an IOMMU page table entry associated with the memory buffer.

When second value matches the first value, in an example, the data writing module 216 may associated a read-only attribute with an IOMMU page table entry associated with the memory buffer. The data writing module may then request the IOMMU page table entry be write enabled. For example, the data writing module 216 may send an instruction to the device driver 114. In another example, the data writing module 216 may selecting a new memory page to write the first bit sequence to. To reduce latency, the data writing module 216 does not need to wait for results from the read operation relating to the test bit sequence. In an example, data writing module 216 can skip writing the test bit sequence when the contents of the selected IOMMU page table entry is known in advance (e.g., when IOMMU page table entry has not been previously allocated, when data mapped written to the IOMMU page table entry is known to be different than data sequence, etc.).

Figure 3:
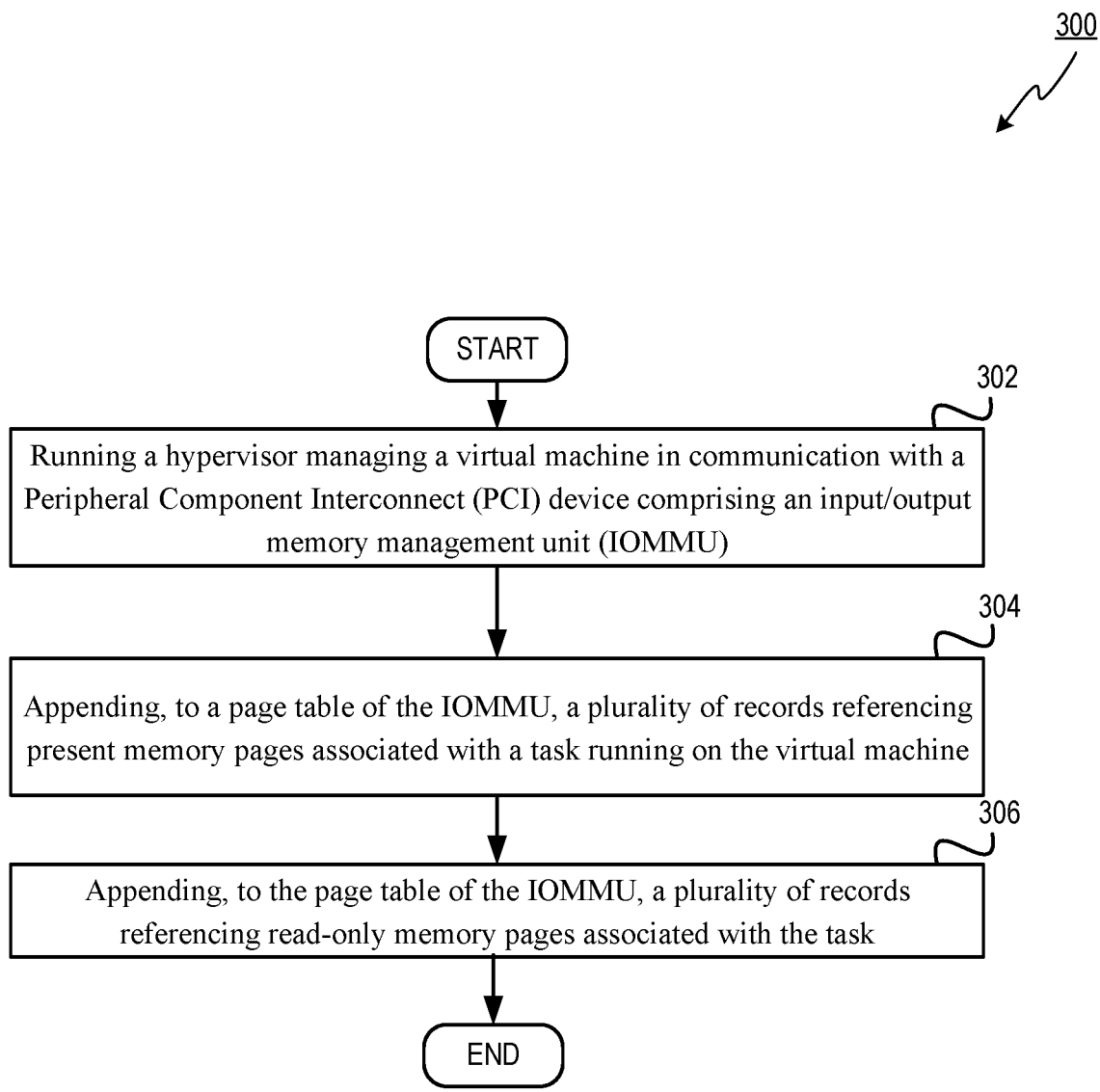
FIG. 3 depicts a flow diagram of an example method for PCI device memory management, in accordance with one or more aspects of the present disclosure.

FIG. 3 depicts a flow diagram of an illustrative example of a method 300 for virtualized memory management, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 302. At block 302, a host computer system may run a hypervisor managing a virtual machine in communication with a PCI device. The PCI device may include an IOMMU. The host computer system may determine that a virtual machine is running a task. One or more memory pages related to the task may be loaded into host memory. The memory-resident pages may be present memory pages, read-only memory pages, or other memory pages. Memory-resident pages may be indicated by a present bit at each mapping in between a guest physical address and a host physical address. Memory pages that are not loaded into host memory may reside in physical storage memory.

At block 304, the host computer system may append, to a page table of the IOMMU, a plurality of present memory pages associated with a task in running on the virtual machine. At block 306, the host computer system may append, to the page table of the IOMMU, a plurality of read-only memory pages associated with the task. Each of the read-only memory pages may be indicated as read-only in the page table. In an example, the PCI device may update the IOMMU page table to include page table entries for present memory pages and read-only memory pages. In another example, when the IOMMU page table format is the same a page table format used by the host system, the PCI device may point to the host page table of the task as a root directory. In yet another example, when the IOMMU page table format is different than the page table format used by the host system, the PCI device may create page table entries in the IOMMU page table associated with the present memory pages and the read-only memory pages. Responsive to completing the operations described herein above with references to block 312, the method may terminate.

Figure 4:
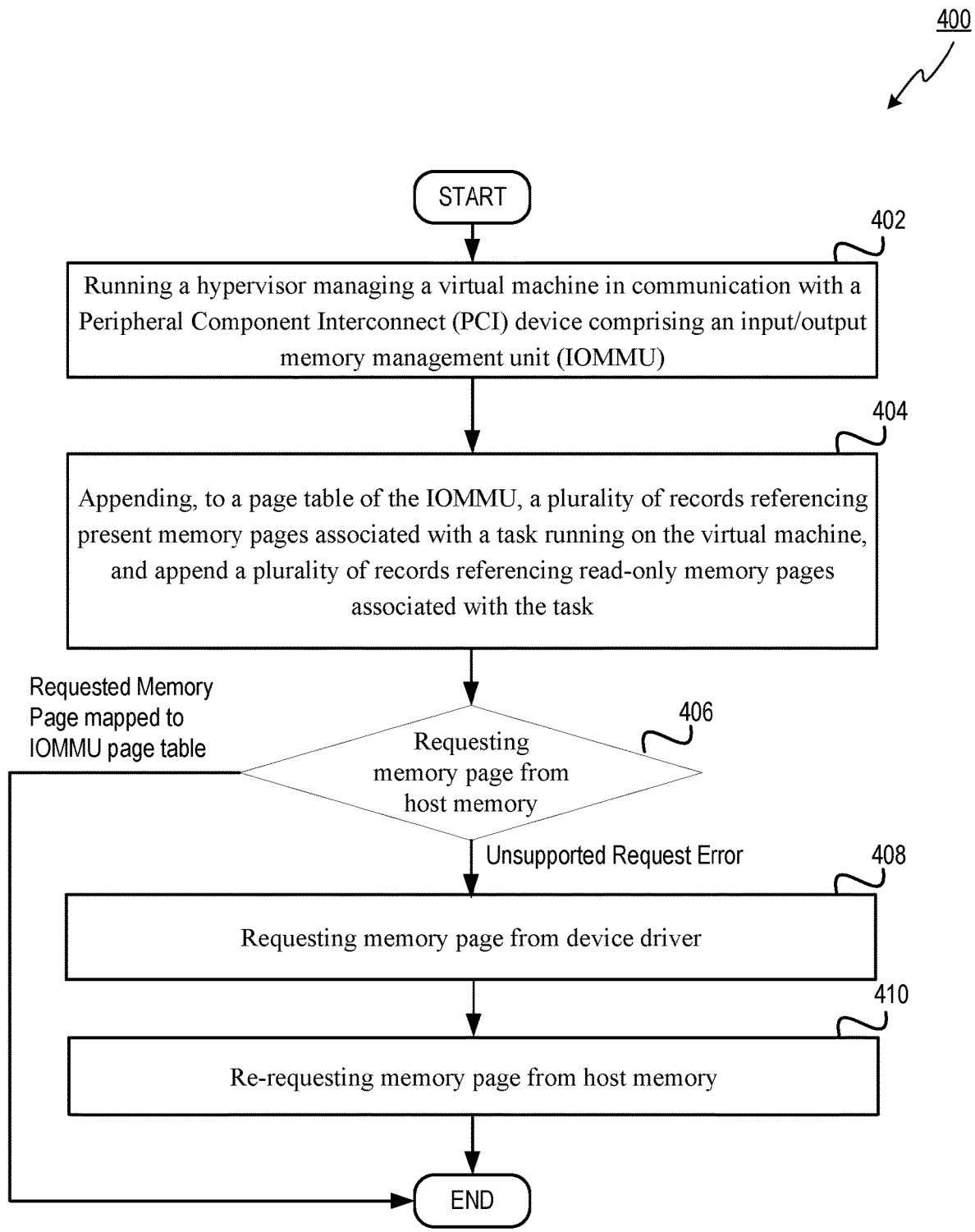
FIG. 4 depicts a flow diagram of an example method for PCI device memory management, in accordance with one or more aspects of the present disclosure.

FIG. 4 depicts a flow diagram of one illustrative example of a method 400 for virtualized memory management, in accordance with one or more aspects of the present disclosure. Method 400 may be similar to method 300 and may be performed in the same or a similar manner as described above in regards to method 300. Method 400 may be performed by processing devices of a server device or a client device and may begin at block 402. At block 402, a host computer system may run a hypervisor managing a virtual machine in communication with a PCI device. The PCI device may include an IOMMU. One or more memory pages related to the task may be loaded into host memory. The memory-resident pages may be present memory pages, read-only memory pages, or other memory pages. Memory-resident pages may be indicated by a present bit at each mapping in between a guest physical address and a host physical address. Memory pages that are not loaded into host memory may reside in physical storage memory.

At block 404, the host computer system may append, to a page table of the IOMMU, a plurality of present memory pages associated with a task in running on the virtual machine and a plurality of read-only memory pages associated with the task. Each of the read-only memory pages may be indicated as read-only in the page table. In an example, the PCI device may update the IOMMU page table to include page table entries for present memory pages and read-only memory pages. In another example, when the IOMMU page table format is the same a page table format used by the host system, the PCI device may point to the host page table of the task as a root directory. In yet another example, when the IOMMU page table format is different than the page table format used by the host system, the PCI device may create page table entries in the IOMMU page table associated with the present memory pages and the read-only memory pages At block 406, the host computer system may cause the PCI device to attempt memory access. In an example, when the PCI device receives a memory page request to access one or more memory page(s) related to the task, the PCI device may attempt to access the requested memory page directly from the host memory by referring to the IOMMU page table.

When the requested memory page is mapped in the IOMMU page table, method 400 may end. When a requested memory page is not mapped in the IOMMU page table, an unsupported request error may occur. At block 408, in response an unsupported request error, the host computer system may cause the PCI device to request the requested memory page from a device driver of the virtual machine. The device driver may then execute an instruction to the hypervisor requesting the requested memory page be loaded from physical storage memory to host memory. Once the requested memory page is loaded onto the host memory, the device driver may indicate to the PCI device that the requested page is loaded into the host memory.

At block 410, the host computer system may cause the PCI device to re-request the memory page from the host memory. Responsive to completing the operations described herein above with references to block 410, the method may terminate.

Figure 5:
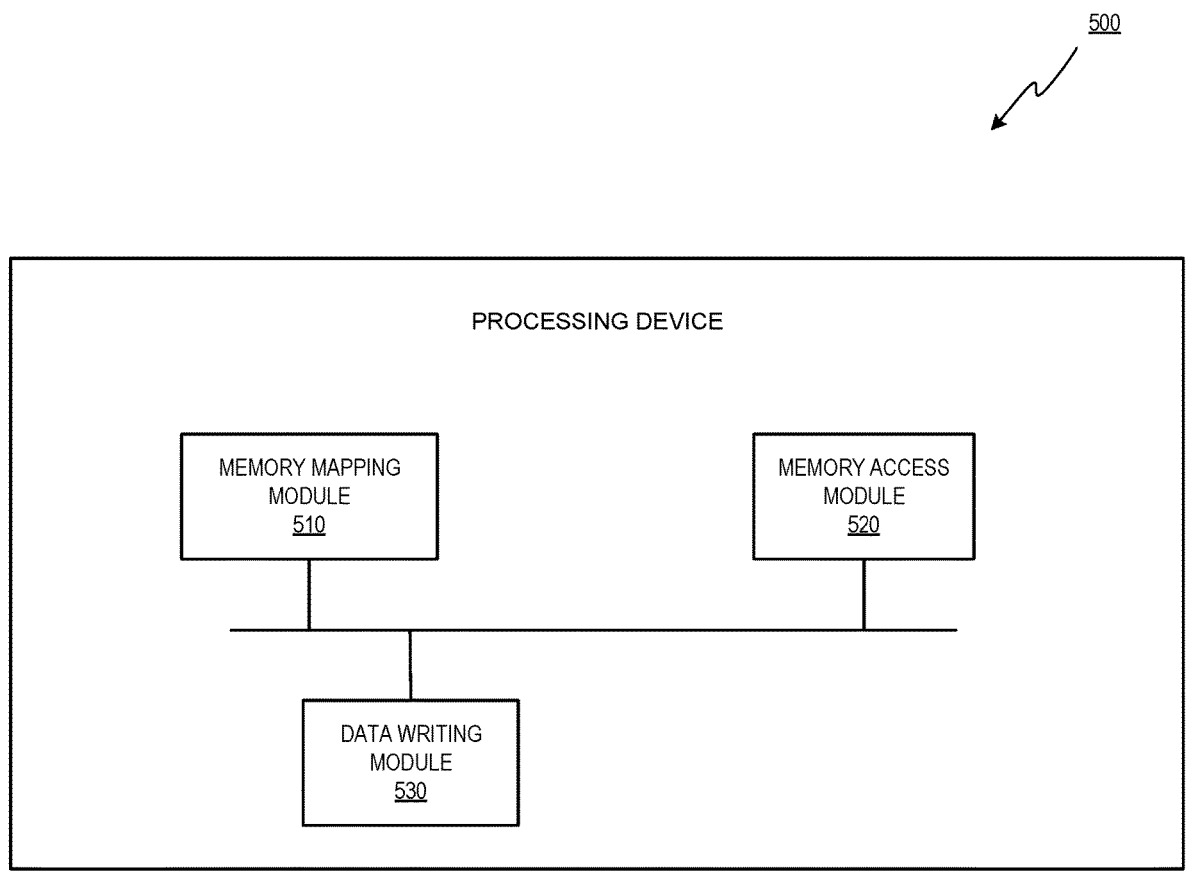
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 200 and computer system 100 and may include one or more processing devices and one or more memory devices. In the example shown, computer system 500 may include a memory mapping module 510, a memory access module 520, and an execution module 530.

Memory mapping module 510 may enable the PCI device to append, to a page table of an IOMMU, a plurality of present memory pages associated with a task in running on a virtual machine. Memory mapping module 510 may further append, to the page table of the IOMMU, a plurality of read-only memory pages associated with the task. Each of the read-only memory pages may be indicated as read-only in the page table. In an example, the memory mapping module 510 may update the IOMMU page table to include page table entries for present memory pages and read-only memory pages. In another example, when the IOMMU page table format is the same a page table format used by the host system, the memory mapping module 510 may point to the host page table of the task as a root directory. In yet another example, when the IOMMU page table format is different than the page table format used by the host system, the memory mapping module 510 may create page table entries in the IOMMU page table associated with the present memory pages and the read-only memory pages.

Memory access module 520 enable a PCI device to attempt memory access. In an example, when the memory access module 520 receives a memory page request to access one or more memory page(s) related to the task, the memory access module 520 may attempt to access the requested memory page directly from the host memory by referring to the IOMMU page table.

When a requested memory page is not mapped in the IOMMU page table, an unsupported request error may occur. In response the unsupported request error, the memory access module 520 may request the requested memory page from a device driver of the virtual machine. The device driver may then execute an instruction to the hypervisor requesting the requested memory page be loaded from physical storage memory to host memory. Once the requested memory page is loaded onto the host memory, the device driver may indicate to the memory access module 520 that the requested page is loaded into the host memory. Memory access module 520 may then re-request the memory page from the host memory.

Data writing module 530 may enable the PCI device to write data to a portion of memory. The data writing module 530 may generate a bit sequence relating to write data and select a portion of memory onto which to write the data sequence. The data writing module 530 may then generate a test bit sequence by applying a predetermined transformation to the first sequence. The transformation may include inverting one or more bits in each byte, incrementing a byte by one, applying a bitwise XOR to a byte (thus inverting each bit), or any other transformation that would result in the test bit sequence having at least one bit in each byte be different from the bit sequence. The data writing module 530 may then write the test bit sequence to a memory buffer (e.g., the IOMMU buffer, a host memory buffer, etc.) The data writing module 530 may then read a first value from the memory buffer. The data writing module 530 may then write the bit sequence to the memory buffer and read a second value from the memory buffer. The data writing module 530 may then determine whether the second value matches the first value. When second value does not match the first value, the write module 530 may associate a writable attribute with an IOMMU page table entry associated with the memory buffer. When second value matches the first value, in an example, the data writing module 530 may associated a read-only attribute with an IOMMU page table entry associated with the memory buffer. The data writing module may then request the IOMMU page table entry be write enabled. For example, the data writing module 530 may send an instruction to the device driver. In another example, the data writing module 530 may selecting a new memory page to write the first bit sequence to.

Figure 6:
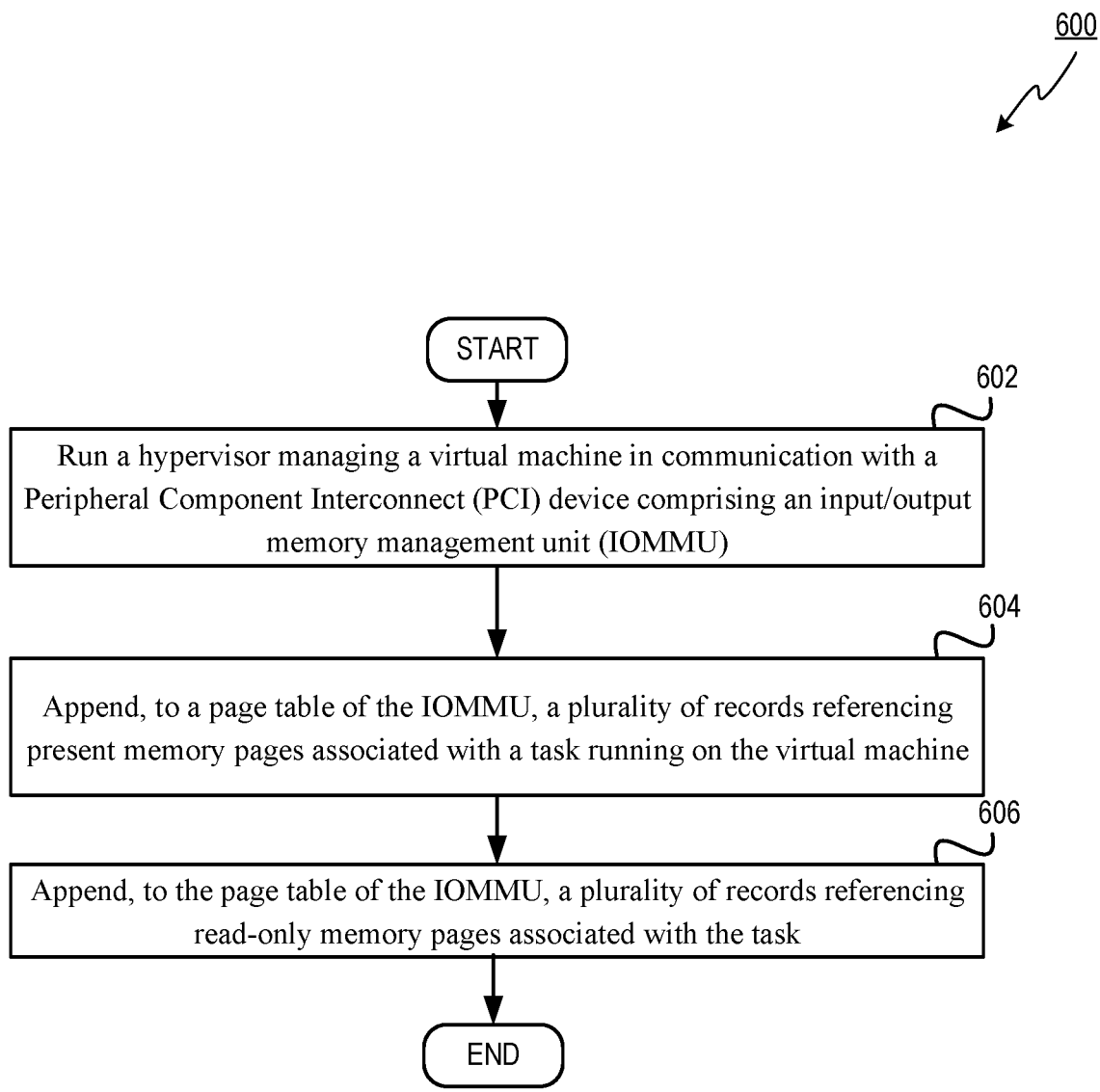
FIG. 6 depicts a flow diagram of an example method for PCI device memory management, in accordance with one or more aspects of the present disclosure.

FIG. 6 depicts a flow diagram of one illustrative example of a method 600 for virtualized memory management, in accordance with one or more aspects of the present disclosure. Method 600 may be similar to method 300 and may be performed in the same or a similar manner as described above in regards to method 300. Method 600 may be performed by processing devices of a server device or a client device and may begin at block 602.

At block 602, the processing device may run a hypervisor managing a virtual machine in communication with a PCI device. The PCI device may include an IOMMU. One or more memory pages related to a task running on the virtual machine may be loaded into host memory. The memory-resident pages may be present memory pages, read-only memory pages, or other memory pages. Memory-resident pages may be indicated by a present bit at each mapping in between a guest physical address and a host physical address. Memory pages that are not loaded into host memory may reside in physical storage memory.

At block 604, the processing device may append, to a page table of the IOMMU, a plurality of present memory pages associated with a task in running on the virtual machine. At block 606, the processing device may append, to the page table of the IOMMU, a plurality of read-only memory pages associated with the task. Each of the read-only memory pages may be indicated as read-only in the page table. In an example, the processing device may update the IOMMU page table to include page table entries for present memory pages and read-only memory pages. In another example, when the IOMMU page table format is the same a page table format used by the host system, the processing device may point to the host page table of the task as a root directory. In yet another example, when the IOMMU page table format is different than the page table format used by the host system, the processing device may create page table entries in the IOMMU page table associated with the present memory pages and the read-only memory pages.

Responsive to completing the operations described herein above with references to block 612, the method may terminate.

Figure 7:
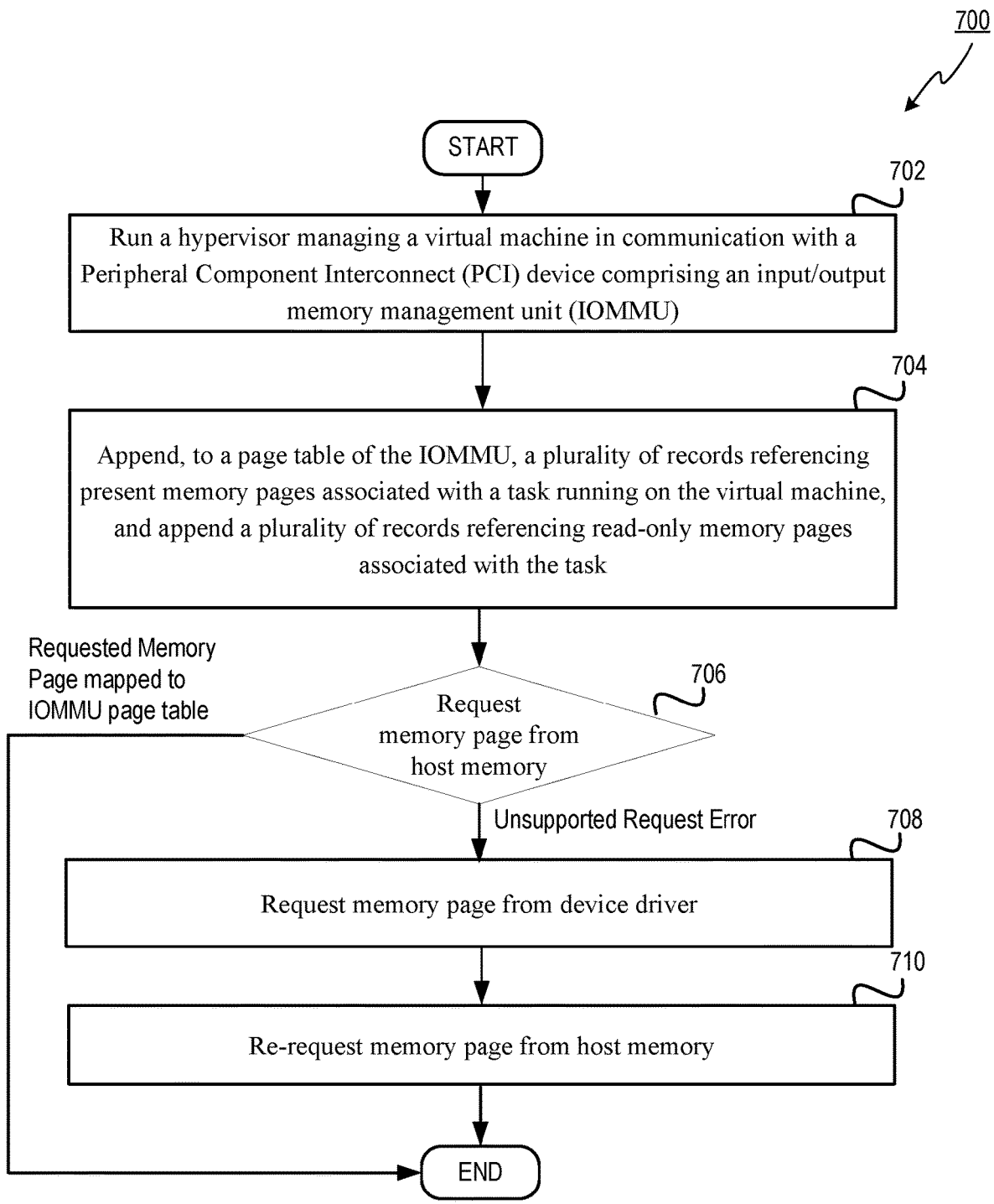
FIG. 7 depicts a flow diagram of an example method for PCI device memory management, in accordance with one or more aspects of the present disclosure.

FIG. 7 depicts a flow diagram of one illustrative example of a method 700 for virtualized memory management, in accordance with one or more aspects of the present disclosure. Method 700 may be similar to method 600 and may be performed in the same or a similar manner as described above in regards to method 600. Method 700 may be performed by processing devices of a server device or a client device and may begin at block 702.

At block 702, the processing device may run a hypervisor managing a virtual machine in communication with a PCI device. The PCI device may include an IOMMU. One or more memory pages related to a task running on the virtual machine may be loaded into host memory. The memory-resident pages may be present memory pages, read-only memory pages, or other memory pages. Memory-resident pages may be indicated by a present bit at each mapping in between a guest physical address and a host physical address. Memory pages that are not loaded into host memory may reside in physical storage memory.

At block 704, the processing device may append, to a page table of the IOMMU, a plurality of present memory pages associated with a task in running on the virtual machine, and append a plurality of read-only memory pages associated with the task. Each of the read-only memory pages may be indicated as read-only in the page table. In an example, the processing device may update the IOMMU page table to include page table entries for present memory pages and read-only memory pages. In another example, when the IOMMU page table format is the same a page table format used by the host system, the processing device may point to the host page table of the task as a root directory. In yet another example, when the IOMMU page table format is different than the page table format used by the host system, the processing device may create page table entries in the IOMMU page table associated with the present memory pages and the read-only memory pages.

At block 706, the processing device may cause the PCI device to attempt memory access. In an example, when the PCI device receives a memory page request to access one or more memory page(s) related to the task, the PCI device may attempt to access the requested memory page directly from the host memory by referring to the IOMMU page table.

Figure 8:
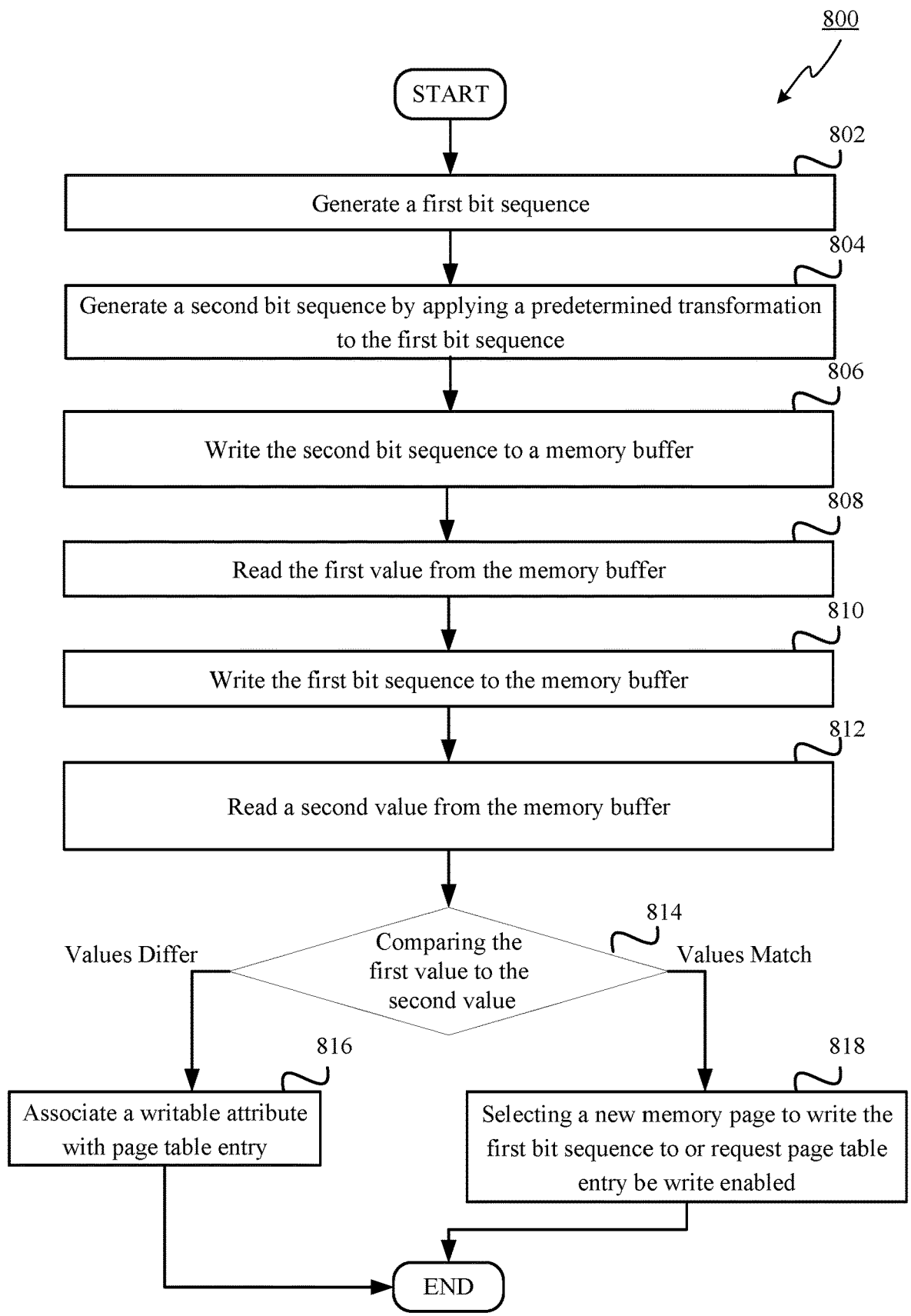
FIG. 8 depicts a flow diagram of an example method for PCI device write operations, in accordance with one or more aspects of the present disclosure.

When the requested memory page is mapped in the IOMMU page table, method 700 may end. When a requested memory page is not mapped in the IOMMU page table, an unsupported request error may occur. At block 708, in response an unsupported request error, the processing device may cause the PCI device to request the requested memory page from a device driver of the virtual machine. The device driver may then execute an instruction to the hypervisor requesting the requested memory page be loaded from physical storage memory to host memory. Once the requested memory page is loaded onto the host memory, the device driver may indicate to the PCI device that the requested page is loaded into the host memory. At block 710, the processing device cause the PCI device to re-request the memory page from the host memory. Responsive to completing the operations described herein above with references to block 710, the method may terminate FIG. 8 depicts a flow diagram of an illustrative example of a method 800 for PCI write operations, in accordance with one or more aspects of the present disclosure. Method 800 and each of its individual functions, routines, subroutines, or operations may be performed by one or more processors of the computer device executing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processes implementing method 800 may be executed asynchronously with respect to each other.

Method 800 may be performed by processing devices of a server device or a client device and may begin at block 802. At block 802, a processing device in communication with an input/output memory management unit (IOMMU) may generate a first bit sequence. The processing device may be comprised of a PCI device. At block 804, the processing device may generate a second bit sequence by applying a predetermined transformation to the first bit sequence. The transformation may include inverting one or more bits in each byte, incrementing a byte by one, applying a bitwise XOR to a byte (thus inverting each bit), or any other transformation that would result in the test bit sequence having at least one bit in each byte be different from the bit sequence. At block 806, the processing device may write the second bit sequence to a memory buffer. At block 808, the processing device may read the first value from the memory buffer. At block 810, the processing device may write the first bit sequence to the memory buffer. At block 812, the processing device may read a second value from the memory buffer. At block 814, the processing device may compare the first value to the second value. At block 816, in response to the second value does not matching the first value, the processing device may associate a writable attribute with an IOMMU page table entry associated with the memory buffer. At block 818, in response to the second value matching the first value, the processing device may associate a read-only attribute with an IOMMU page table entry associated with the memory buffer, and request the IOMMU page table entry be write enabled or select a new memory page to write the first bit sequence to. Responsive to completing the operations described herein above with references to block 818, the method may terminate.

Figure 9:
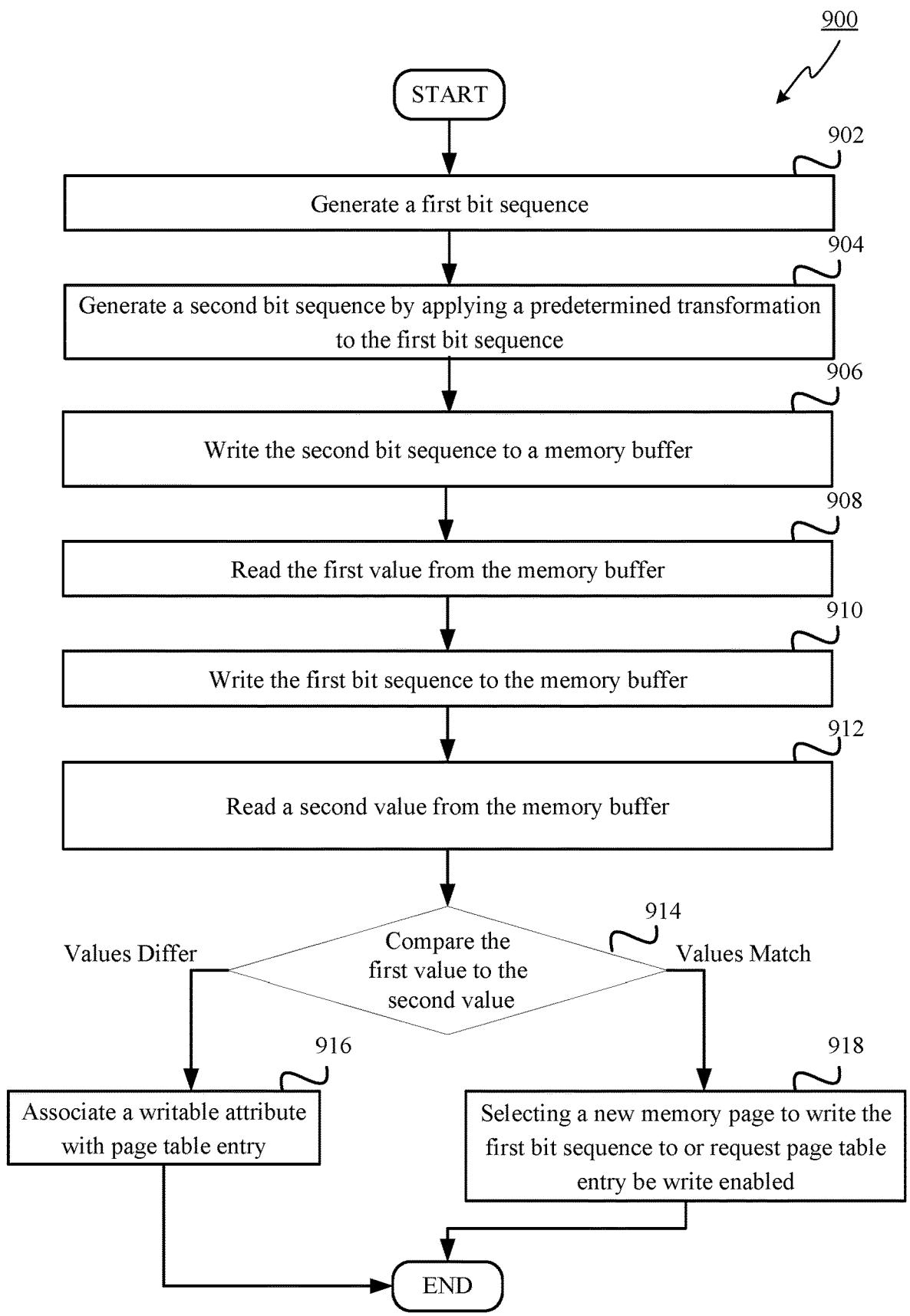
FIG. 9 depicts a flow diagram of an example method for PCI device write operations, in accordance with one or more aspects of the present disclosure.

FIG. 9 depicts a flow diagram of one illustrative example of a method 900 for PCI device write operations, in accordance with one or more aspects of the present disclosure. Method 900 may be similar to method 800 and may be performed in the same or a similar manner as described above in regards to method 800. Method 900 may be performed by processing devices of a server device or a client device and may begin at block 902.

At block 902, a processing device may generate a first bit sequence. At block 904, the processing device may generate a second bit sequence by applying a predetermined transformation to the first bit sequence. The transformation may include inverting one or more bits in each byte, incrementing a byte by one, applying a bitwise XOR to a byte (thus inverting each bit), or any other transformation that would result in the test bit sequence having at least one bit in each byte be different from the bit sequence. At block 906, the processing device may write the second bit sequence to a memory buffer. At block 908, the processing device may read the first value from the memory buffer. At block 910, the processing device may write the first bit sequence to the memory buffer. At block 912, the processing device may read a second value from the memory buffer. At block 914, the processing device may compare the first value to the second value. At block 916, in response to the second value does not matching the first value, the processing device may associate a writable attribute with an IOMMU page table entry associated with the memory buffer. At block 918, in response to the second value matching the first value, the processing device may associate a read-only attribute with an IOMMU page table entry associated with the memory buffer, and request the IOMMU page table entry be write enabled or select a new memory page to write the first bit sequence to. Responsive to completing the operations described herein above with references to block 918, the method may terminate.

Figure 10:
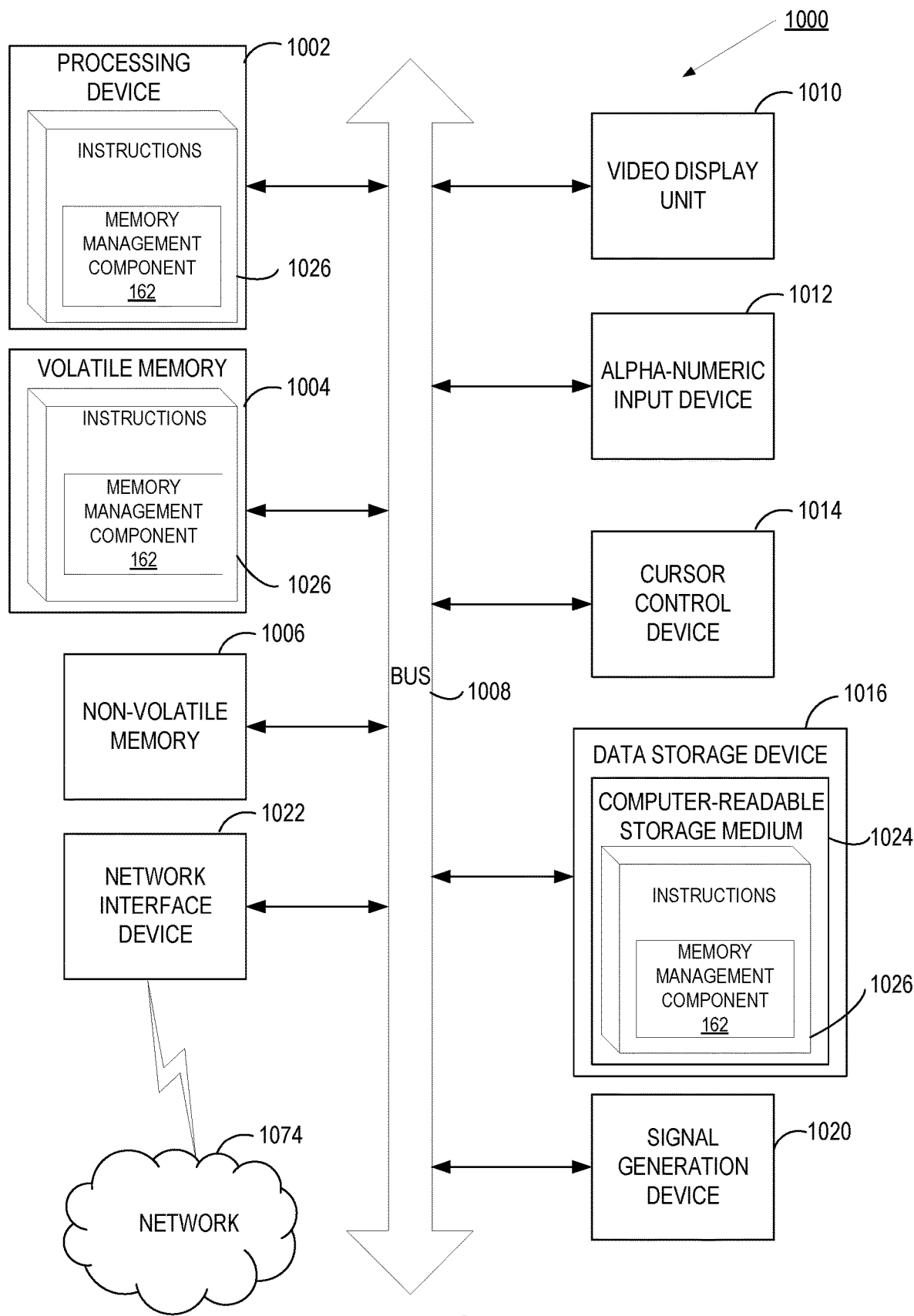
FIG. 10 depicts a block diagram of an illustrative computing device operating in accordance with the examples of the present disclosure.

FIG. 10 depicts a block diagram of a computer system operating in accordance with one or more aspects of the present disclosure. In various illustrative examples, computer system 1000 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1006 (e.g., read-only memory (ROM) or electrically-erasable programmable ROM (EEPROM)), and a data storage device 1016, which may communicate with each other via a bus 808.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 300, 400, 600, 700, 800, or 900 and for memory management component 162, execution component 122 (not shown), and modules illustrated in FIGS. 1 and 2.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: running, by a host computer system, a hypervisor managing a virtual machine in communication with a peripheral device, wherein the peripheral device comprises an input/output memory management unit (IOMMU); appending, to a page table of the IOMMU, a plurality of records referencing present memory pages associated with a task running on the virtual machine; and appending, to the page table of the IOMMU, a plurality of records referencing read-only memory pages associated with the task, wherein the read-only memory pages are indicated as read-only in the page table.

Example 2 is a method of claim 1, further comprising: accessing, from the hypervisor, a memory page associated with the task.

Example 3 is a method of claim 1, further comprising: responsive to determining that a record referencing a memory page is not present in the page table of the IOMMU, requesting the memory page from a device driver of the virtual machine; and accessing the memory page.

Example 4 is a method of claim 1, further comprising: in response to determining that the page table of the IOMMU and a page table of the hypervisor use the same page table format, pointing the IOMMU to the page table of the hypervisor.

Example 5 is a method of claim 1, wherein the peripheral device comprises a Peripheral Component Interconnect (PCI) device.

Example 6 is a method of claim 1, further comprising: generating a first bit sequence; generating a second bit sequence by applying a predetermined transformation to the first bit sequence; writing the second bit sequence to a memory buffer, wherein the memory buffer comprises a memory page referenced by the page table of the IOMMU; reading a first value from the memory buffer; writing the first bit sequence to the memory buffer; reading a second value from the memory buffer; responsive to determining that the second value does not match the first value, associating a writable attribute with an IOMMU page table entry associated with the memory buffer.

Example 7 is a method of claim 6, wherein the transformation includes at least one of inverting one or more bits in each byte of the bit sequence, incrementing each byte of the bit sequence by one, or applying a bitwise XOR to each byte of the bit sequence.

Example 8 is a method of claim 6, further comprising: responsive to determining that the second value matches the first value, requesting the IOMMU page table entry be write enabled.

Example 9 is a method of claim 6, further comprising: responsive to determining that the second value matches the first value, selecting a new memory page for storing the first bit sequence.

Example 10 is a system, comprising: a memory; and a processing device operatively coupled to the memory, the processing device configured to: run a hypervisor managing a virtual machine in communication with a peripheral device, wherein the peripheral device comprises an input/output memory management unit (IOMMU); append, to a page table of the IOMMU, a plurality of present memory pages associated with a task running on the virtual machine; and append, to the page table of the IOMMU, a plurality of read-only memory pages associated with the task, wherein the read-only memory pages are indicated as read-only in the page table.

Example 11 is a system of claim 10, wherein the processing device is configured to: access, from the hypervisor, memory pages associated with the task.

Example 12 is a system of claim 10, wherein the processing device is configured to: in response to a record referencing a memory page not being present in the page table of the IOMMU, request the memory page from a device driver of the virtual machine; access the memory page.

Example 13 is a system of claim 10, wherein the processing device is configured to: in response to determining that the page table of the IOMMU and a page table of the hypervisor use the same page table format, pointing the IOMMU to the page table of the hypervisor.

Example 14 is a system of claim 10, wherein the processing device comprises a Peripheral Component Interconnect (PCI) device.

Example 15 is a system of claim 10, wherein the processing device is configured to: generate a first bit sequence; generate a second sequence by applying a predetermined transformation to the first bit sequence; write the second bit sequence to a memory buffer, wherein the memory buffer comprises a memory page referenced by the page table of the IOMMU; read a first value from the memory buffer; write the first bit sequence to the memory buffer; read a second value from the memory buffer; responsive to determining that the second value does not match the first value, associate a writable attribute with an IOMMU page table entry associated with the memory buffer.

Example 16 is a system of claim 15, wherein the transformation includes at least one of inverting one or more bits in each byte of the bit sequence, incrementing each byte of the bit sequence by one, or applying a bitwise XOR to each byte of the bit sequence.

Example 17 is a system of claim 15, wherein the processing device is further configured to: responsive to determining that the second value matches the first value, request the IOMMU page table entry be write enabled.

Example 18 is a system of claim 15, wherein the processing device is further configured to: responsive to determining that the second value matches the first value, select a new memory page for storing the first bit sequence.

Example 19 is a non-transitory machine-readable storage medium storing instructions that cause a processing device to: run a hypervisor managing a virtual machine in communication with a peripheral device, wherein the peripheral device comprises an input/output memory management unit (IOMMU); append, to a page table of the IOMMU, a plurality of present memory pages associated with a task running on the virtual machine; and append, to the page table of the IOMMU, a plurality of read-only memory pages associated with the task, wherein the read-only memory pages are indicated as read-only in the page table.

Example 20 is a non-transitory machine-readable storage medium of claim 19, wherein the processing device is configured to: access, from the hypervisor, memory pages associated with the task.

Example 21 is a non-transitory machine-readable storage medium of claim 19, wherein the processing device is configured to: in response to a record referencing a memory page not being present in the page table of the IOMMU, request the memory page from a device driver of the virtual machine; access the memory page.

Example 22 is a non-transitory machine-readable storage medium of claim 19, wherein the processing device is configured to: in response to determining that the page table of the IOMMU and a page table of the hypervisor use the same page table format, pointing the IOMMU to the page table of the hypervisor.

Example 23 is a non-transitory machine-readable storage medium of claim 19, wherein the peripheral device comprises a Peripheral Component Interconnect (PCI) device.

Example 24 is a non-transitory machine-readable storage medium of claim 19, wherein the processing device is configured to: generate a first bit sequence; generate a second sequence by applying a predetermined transformation to the first bit sequence; write the second bit sequence to a memory buffer, wherein the memory buffer comprises a memory page referenced by the page table of the IOMMU; read a first value from the memory buffer; write the first bit sequence to the memory buffer; read a second value from the memory buffer; responsive to determining that the second value does not match the first value, associate a writable attribute with an IOMMU page table entry associated with the memory buffer.

Example 25 is a non-transitory machine-readable storage medium of claim 24, wherein the transformation includes at least one of inverting one or more bits in each byte of the bit sequence, incrementing each byte of the bit sequence by one, or applying a bitwise XOR to each byte of the bit sequence.

Example 26 is a non-transitory machine-readable storage medium of claim 24, further comprising: responsive to determining that the second value matches the first value, requesting the IOMMU page table entry be write enabled.

Example 27 is a non-transitory machine-readable storage medium of claim 24, further comprising: responsive to determining that the second value matches the first value, selecting a new memory page for storing the first bit sequence.

Example 28 is an apparatus comprising: a means for running a hypervisor managing a virtual machine in communication with a peripheral device, wherein the peripheral device comprises an input/output memory management unit (IOMMU); a means for appending, to a page table of the IOMMU, a plurality of records referencing present memory pages associated with a task running on the virtual machine; and a means for appending, to the page table of the IOMMU, a plurality of records referencing read-only memory pages associated with the task, wherein the read-only memory pages are indicated as read-only in the page table.

Example 29 is a method comprising: generating, by a processing device in communication with an input/output memory management unit (IOMMU), a first bit sequence; generating a second sequence by applying a predetermined transformation to the first bit sequence; writing the second bit sequence to a memory buffer; reading a first value from the memory buffer; writing the first bit sequence to the memory buffer; reading a second value from the memory buffer; responsive to determining that the second value does not match the first value, associating a writable attribute with an IOMMU page table entry associated with the memory buffer.

Example 30 is a method of claim 29, wherein the transformation includes at least one of inverting one or more bits in each byte of the bit sequence, incrementing each byte of the bit sequence by one, or applying a bitwise XOR to each byte of the bit sequence.

Example 31 is a method of claim 29, further comprising: responsive to determining that the second value matches the first value, requesting the IOMMU page table entry be write enabled.

Example 32 is a method of claim 29, further comprising: responsive to determining that the second value matches the first value, selecting a new memory page to write the first bit sequence to.

Example 33 is a method of claim 29, further comprising: appending, to a page table of the IOMMU, a plurality of records referencing present memory pages associated with a task running on the virtual machine; and appending, to the page table of the IOMMU, a plurality of records referencing read-only memory pages associated with the task, wherein the read-only memory pages are indicated as read-only in the page table.

Example 34 is a method of claim 29, wherein the processing device is comprised by a Peripheral Component Interconnect (PCI) device.

Example 35 is a system comprising a memory; an input/output memory management unit (IOMMU) coupled to the memory; and a processing device operatively coupled to the IOMMU, the processing device configured to: generate a first bit sequence; generate a second sequence by applying a predetermined transformation to the first bit sequence; write the second bit sequence to a memory buffer; read a first value from the memory buffer; write the first bit sequence to the memory buffer; read a second value from the memory buffer; and responsive to determining that the second value does not match the first value, associate a writable attribute with an IOMMU page table entry associated with the memory buffer.

Example 36 is a system of claim 35, wherein the transformation includes at least one of inverting one or more bits in each byte of the bit sequence, incrementing each byte of the bit sequence by one, or applying a bitwise XOR to each byte of the bit sequence.

Example 37 is a system of claim 35, wherein the processing device is further to: responsive to determining that the second value matches the first value, request the IOMMU page table entry be write enabled.

Example 38 is a system of claim 35, wherein the processing device is further to: responsive to determining that the second value matches the first value, select a new memory page to write the first bit sequence to.

Example 39 is a system of claim 35: wherein the processing device is further to: append a page table of the IOMMU, a plurality of records referencing present memory pages associated with a task running on the virtual machine; and append, to the page table of the IOMMU, a plurality of records referencing read-only memory pages associated with the task, wherein the read-only memory pages are indicated as read-only in the page table.

Example 40 is a non-transitory machine-readable storage medium storing instructions that cause a processing device to: generate a first bit sequence; generate a second sequence by applying a predetermined transformation to the first bit sequence; write the second bit sequence to a memory buffer; read a first value from the memory buffer; write the first bit sequence to the memory buffer; read a second value from the memory buffer; and responsive to determining that the second value does not match the first value, associate a writable attribute with an IOMMU page table entry associated with the memory buffer.

Example 41 is a non-transitory machine-readable storage medium of claim 40, wherein the transformation includes at least one of inverting one or more bits in each byte of the bit sequence, incrementing each byte of the bit sequence by one, or applying a bitwise XOR to each byte of the bit sequence.

Example 42 is a non-transitory machine-readable storage medium of claim 41, wherein the processing device is further to: responsive to determining that the second value matches the first value, request the IOMMU page table entry be write enabled.

Example 43 is a non-transitory machine-readable storage medium of claim 41, wherein the processing device is further to: responsive to determining that the second value matches the first value, select a new memory page to write the first bit sequence to.

Example 44 is a non-transitory machine-readable storage medium of claim 41, wherein the processing device is further to: append a page table of the IOMMU, a plurality of records referencing present memory pages associated with a task running on the virtual machine; and append, to the page table of the IOMMU, a plurality of records referencing read-only memory pages associated with the task, wherein the read-only memory pages are indicated as read-only in the page table.

Example 45 is an apparatus comprising: a means for generating a first bit sequence; a means for generating a second sequence by applying a predetermined transformation to the first bit sequence; a means for writing the second bit sequence to a memory buffer; a means for reading a first value from the memory buffer; a means for writing the first bit sequence to the memory buffer; a means for reading a second value from the memory buffer; and responsive to determining that the second value does not match the first value, a means for associating a writable attribute with an IOMMU page table entry associated with the memory buffer.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, 600, 700, 800, or 900 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    generating, by a processing device in communication with an input/output memory management unit (IOMMU), a first bit sequence;
    generating a second sequence by applying a predetermined transformation to the first bit sequence;
    writing the second bit sequence to a memory buffer;
    reading a first value from the memory buffer;
    writing the first bit sequence to the memory buffer;
    reading a second value from the memory buffer; and
    responsive to determining that the second value does not match the first value, associating a writable attribute with an IOMMU page table entry associated with the memory buffer.

2. The method of claim 1, wherein the transformation includes at least one of inverting one or more bits in each byte of the bit sequence, incrementing each byte of the bit sequence by one, or applying a bitwise XOR to each byte of the bit sequence.

3. The method of claim 1, further comprising:
    responsive to determining that the second value matches the first value, requesting the IOMMU page table entry be write enabled.

4. The method of claim 1, further comprising:
    responsive to determining that the second value matches the first value, selecting a new memory page to write the first bit sequence to.

5. The method of claim 1, further comprising:
    appending, to a page table of the IOMMU, a plurality of records referencing present memory pages associated with a task running on the virtual machine; and
    appending, to the page table of the IOMMU, a plurality of records referencing read-only memory pages associated with the task, wherein the read-only memory pages are indicated as read-only in the page table.

6. The method of claim 1, further comprising:
    responsive to determining that the page table of the IOMMU and a page table of the hypervisor use the same page table format, pointing the IOMMU to the page table of the hypervisor.

7. The method of claim 1, wherein the processing device is comprised by a Peripheral Component Interconnect (PCI) device.

8. A system, comprising:
    a memory;
    input/output memory management unit (IOMMU) coupled to the memory; and
    a processing device operatively coupled to the IOMMU, the processing device configured to:
    generate a first bit sequence;
    generate a second sequence by applying a predetermined transformation to the first bit sequence;
    write the second bit sequence to a memory buffer;
    read a first value from the memory buffer;
    write the first bit sequence to the memory buffer;
    read a second value from the memory buffer; and
    responsive to determining that the second value does not match the first value, associate a writable attribute with an IOMMU page table entry associated with the memory buffer.

9. The system of claim 8, wherein the transformation includes at least one of inverting one or more bits in each byte of the bit sequence, incrementing each byte of the bit sequence by one, or applying a bitwise XOR to each byte of the bit sequence.

10. The system of claim 8, wherein the processing device is further to: responsive to determining that the second value matches the first value, request the IOMMU page table entry be write enabled.

11. The system of claim 8, wherein the processing device is further to: responsive to determining that the second value matches the first value, select a new memory page to write the first bit sequence to.

12. The system of claim 11, wherein the processing device is further to:
append, to a page table of the IOMMU, a plurality of records referencing present memory pages associated with a task running on the virtual machine; and
append, to the page table of the IOMMU, a plurality of records referencing read-only memory pages associated with the task, wherein the read-only memory pages are indicated as read-only in the page table.

13. A non-transitory machine-readable storage medium storing executable instructions that, when executed by a processing device, cause the processing device to:
generate a first bit sequence;
generate a second bit sequence by applying a predetermined transformation to the first bit sequence;
write the second bit sequence to a memory buffer, wherein the memory buffer comprises a memory page referenced by the page table of an input/output memory management unit (IOMMU);
read a first value from the memory buffer;
write the first bit sequence to the memory buffer;
read a second value from the memory buffer; and
responsive to determining that the second value does not match the first value, associated a writable attribute with an IOMMU page table entry associated with the memory buffer.

14. The system of claim 13, wherein the processing device is comprised by a Peripheral Component Interconnect (PCI) device.

15. The non-transitory machine-readable storage medium of claim 13, wherein the transformation includes at least one of inverting one or more bits in each byte of the bit sequence, incrementing each byte of the bit sequence by one, or applying a bitwise XOR to each byte of the bit sequence.

16. The non-transitory machine-readable storage medium of claim 13, further comprising executable instructions that, when executed by the processing device, cause the processing device to:
responsive to determining that the second value matches the first value, select a new memory page for storing the first bit sequence.

17. The non-transitory machine-readable storage medium of claim 13, further comprising executable instructions that, when executed by the processing device, cause the processing device to:
responsive to determining that the second value matches the first value, request the IOMMU page table entry be write enabled.

18. The non-transitory machine-readable storage medium of claim 13, further comprising executable instructions that, when executed by the processing device, cause the processing device to:
append, to a page table of the IOMMU, a plurality of records referencing present memory pages associated with a task running on the virtual machine; and
append, to the page table of the IOMMU, a plurality of records referencing read-only memory pages associated with the task, wherein the read-only memory pages are indicated as read-only in the page table.

19. The non-transitory machine-readable storage medium of claim 13, further comprising executable instructions that, when executed by the processing device, cause the processing device to:
responsive to determining that the page table of the IOMMU and a page table of the hypervisor use the same page table format, point the IOMMU to the page table of the hypervisor.

20. The non-transitory machine-readable storage medium of claim 13, wherein the processing device is comprised by a Peripheral Component Interconnect (PCI) device.

* * * * *